United States Patent [19]
Schmid et al.

[11] Patent Number: 5,942,285
[45] Date of Patent: Aug. 24, 1999

[54] EXTRUSION COATING COMPOSITIONS AND METHOD

[75] Inventors: Christian Schmid, Jona; Rolf Jung, Meilen; Hans Widmer, Wolfhausen-Bubikon, all of Switzerland; Martin Lu, Mundelein, Ill.; Artemio Jimenez, Hanover Park, Ill.; Louis Sharp, Libertyville, Ill.; Stephen Postle, Lindenhurst, Ill.

[73] Assignee: The Dexter Corporation, Windsor Locks, Conn.

[21] Appl. No.: 09/094,009

[22] Filed: Jun. 9, 1998

Related U.S. Application Data

[63] Continuation of application No. 08/649,480, May 17, 1996, abandoned.

[51] Int. Cl.$^6$ ..................................................... B05D 3/02
[52] U.S. Cl. ...................... 427/318; 427/209; 427/374.3; 427/374.4; 525/438
[58] Field of Search ................................. 427/209, 318, 427/374.3, 374.4, 386

[56] References Cited

U.S. PATENT DOCUMENTS

| | | | |
|---|---|---|---|
| 4,012,363 | 3/1977 | Brüning et al. | 260/75 |
| 4,246,378 | 1/1981 | Kometani et al. | 525/438 |
| 5,407,702 | 4/1995 | Smith et al. | 427/211 |

FOREIGN PATENT DOCUMENTS

| | | | |
|---|---|---|---|
| 2096643 | 6/1991 | Canada | C09D 167/00 |
| 0 067 060 | 5/1982 | European Pat. Off. | B05D 1/26 |
| 0 465 001 A1 | 1/1992 | European Pat. Off. | C08J 3/00 |
| 0 614 956 A1 | 9/1994 | European Pat. Off. | C09D 167/02 |
| 1 446 737 | 10/1969 | Germany . | |
| 2 248 844 | 4/1992 | United Kingdom | C09D 5/03 |
| WO 94/01224 | 1/1994 | WIPO | B05D 1/26 |
| WO 95/06689 | 9/1995 | WIPO | C09D 163/00 |

OTHER PUBLICATIONS

*Chemical Abstracts*, Registry File RN118330–58–8.

*Primary Examiner*—Patricia A. Short
*Attorney, Agent, or Firm*—Marshall, O'Toole, Gerstein, Murray & Borun

[57] ABSTRACT

Solid extrusion coating compositions for metal substrates, a method of extrusion coating a metal substrate, and a metal article are disclosed. The extrusion coating composition is a thermoplastic material and comprises: (a) a polyester having a weight average molecular weight of about 10,000 to about 35,000, and (b) a modifying resin, such as an epoxy resin having an epoxy equivalent weight of about 500 to about 15,000. The extrusion coating composition is applied to a metal substrate in an extrusion process to provide a composition film having a thickness of about 1 to about 40 microns.

39 Claims, 1 Drawing Sheet

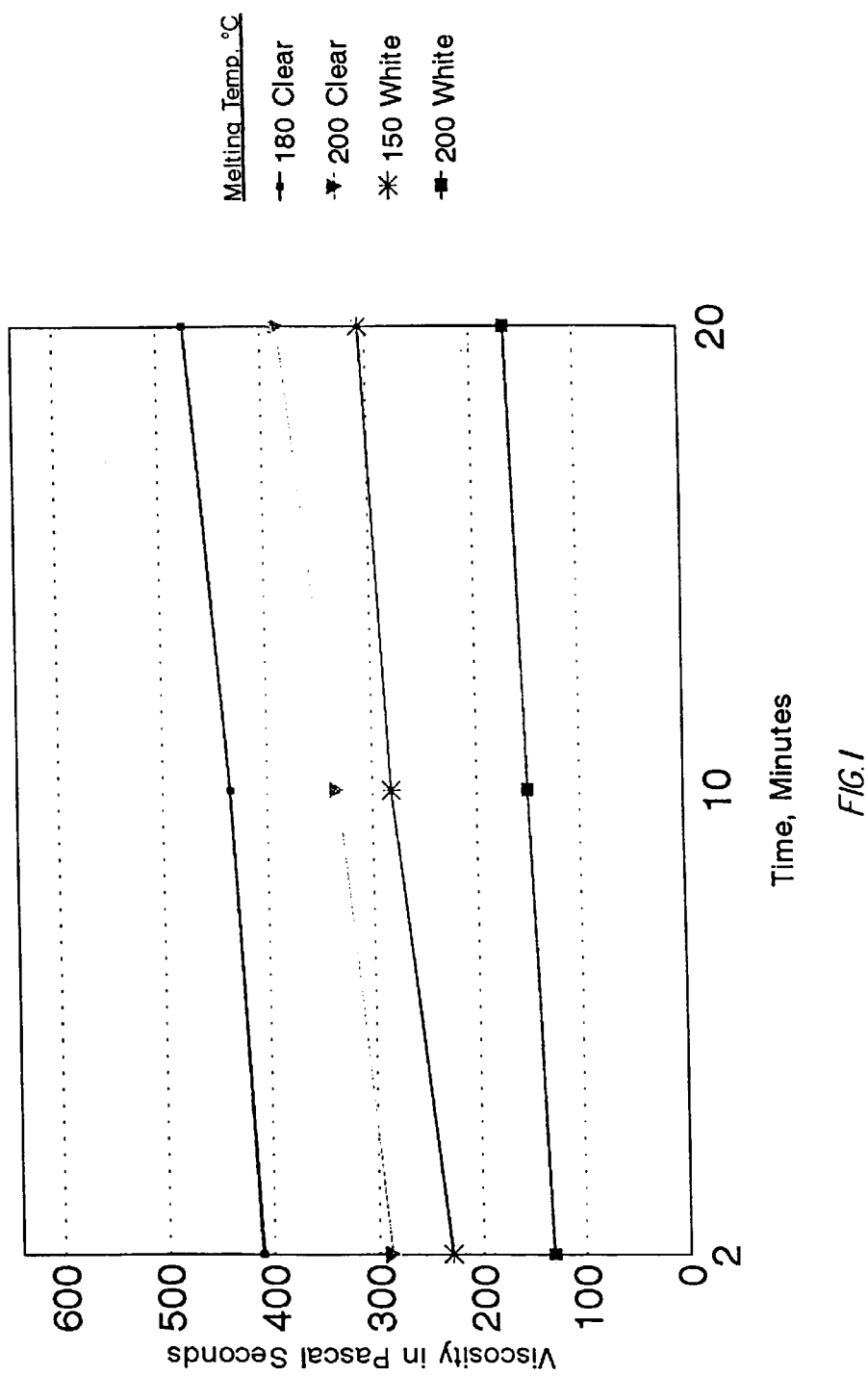
FIG.1 Viscosity vs. Time

EXTRUSION COATING COMPOSITIONS AND METHOD

CROSS-REFERENCE TO RELATED APPLICATION

This application is a continuation of U.S. patent application Ser. No. 08/649,480, filed May 17, 1996, now abandoned.

FIELD OF THE INVENTION

The present invention relates to extrusion coating compositions for metal substrates that, after application, demonstrate excellent adhesion, weatherability, barrier properties, and flexibility; to a method of extrusion coating a metal substrate; and to a metal article, such as a metal can or container, or a material of construction, like aluminum siding, having at least one surface coated with an adherent layer of an extrusion coating composition. An extrusion coating composition comprises: (a) a polyester having a weight average molecular weight of about 10,000 to about 35,000, and (b) a modifying resin, for example, an epoxy or phenoxy resin having an epoxy equivalent weight of about 500 to about 15,000. The extrusion coating composition is applied to a metal substrate as a film having a thickness of about 1 to about 40 microns.

BACKGROUND OF THE INVENTION

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules and water molecules from contacting and interacting with a metal substrate. Imperviousness can be improved by providing a thicker, more flexible and more adhesive coating, but often, improving one advantageous property is achieved at the expense of a second advantageous property.

In addition, practical considerations limit the thickness, adhesive properties and flexibility of a coating applied to a metal substrate. For example, thick coatings are expensive, require a longer cure time, can be esthetically unpleasing and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions often are more susceptible to the solvating properties of water.

In addition, water-based coating compositions do not completely overcome the environmental and toxicological problems associated with organic solvents because water-based compositions typically contain two or more pounds of organic solvent per gallon of coating composition. The organic solvent is a necessary ingredient to dissolve and disperse composition ingredients, and to improve the flow and viscosity of the composition. Therefore, in order to entirely avoid the environmental and toxicological problems associated with organic solvents, investigators have sought solid coating compositions that can be applied to a metal substrate. To date, investigators have had difficulty in providing a solid coating composition that matches a liquid coating composition with respect to film uniformity, film appearance, and film performance.

In prior attempts to find a useful solid coating composition, investigators have tested powder coatings, laminated film coatings, radiation cure coatings, and extrusion coatings. A great deal of research has been performed using free film laminates of polymers such as polyethylene terephthalate (PET), polypropylene (PP), and polyethylene (PE). In this method, a preformed polymer film, about 10 to about 25 microns thick, is applied to the metal substrate. The film laminate method is a rapid method of coating a metal substrate, but the method is expensive and the coated metal substrate does not possess all of the properties required, or desired, by can, can end, and closure manufacturers.

Solid powder coatings also have been used to coat a metal substrate with a coating composition. However, the application of a thin, uniform coating to a metal substrate, i.e., less than 40 microns, is difficult to impossible using the powder coating method. Often, if a thin coating is applied to a metal substrate using a powder coating method, the coating has imperfections which cause the film to fail. Such failures are impermissible in the food and beverage container industry, which further require thin coatings that can withstand shaping of a flat, coated metal substrate into a can, can end, or closure.

Solid coating compositions also have been extruded onto a metal substrate, for example, as disclosed in European Patent No. 0 067 060, PCT publication WO 94/01224, and Smith et al. U.S. Pat. No. 5,407,702. The extrusion coating of a solid composition onto a metal substrate is complicated by the fact that the solid composition must be heated sufficiently to melt the composition for flow through the extrusion apparatus. The heating step can cause a premature cure of the coating composition, especially a thermoset composition, which makes extrusion onto the metal substrate difficult due to crosslinking in the extruder and can adversely affect the performance of the composition coated on the metal substrate.

In order to overcome the problem of premature curing, investigators have attempted to extrude thermoplastic coating compositions onto a metal substrate. These investigators also encountered serious problems, such as composition components having either too high of a molecular weight for easy, economical extrusion, or too low of a molecular weight thereby providing an extruded film that is too soft for many practical applications, such as on the interior or exterior of a food or beverage container. Therefore, many patents and publications in the field are directed to extrusion apparatus and extrusion methods which permit the application of such solid coating compositions to a metal substrate.

Investigators, therefore, have sought a solid, extrudable coating composition for use on the exterior and interior of food and beverage containers that exhibits the advantageous properties of adhesion, flexibility, chemical resistance, and corrosion inhibition, and that is economical and does not adversely affect the taste or other aesthetic properties of sensitive food and beverages packaged in the container. Investigators especially have sought useful extrusion coating compositions in order to reduce the environmental and toxicological concerns associated with organic solvents. In particular, investigators have sought a solid, extrusion coating composition for food and beverage containers (1) that meets increasingly strict environmental regulations, (2) has corrosion inhibition properties at least equal to existing organic solvent-based coating compositions, and (3) is easily extruded onto a metal substrate as a thin, uniform film. Such an extrusion coating composition would satisfy a long felt need in the art.

A present extrusion coating composition comprises: (a) a polyester, and (b) a modifying resin. A present extrusion coating composition is a thermoplastic composition and is extrudable onto a metal substrate. Therefore, a crosslinking step, such as an additional heating step after extrusion of the composition onto the metal substrate or use of a crosslinking agent, is not required. A present extrusion coating composition is free of organic solvents, yet an extruded film demonstrates excellent coating properties, such as adhesion, hardness and flexibility.

A solid, extrusion coating composition of the present invention contains no organic solvents, and, therefore, overcomes the environmental and toxicological problems associated with liquid coating compositions. The present thermoplastic extrusion coating compositions also provide a sufficiently flexible extruded coating such that the coated metal substrate can be deformed without destroying film continuity. In contrast, thermosetting compositions often provide a rigid cured film thereby making it difficult to impossible to coat the metal substrate prior to deforming, i.e., shaping, the metal substrate into a metal article, like a metal closure, can, or can end. Coating a metal substrate prior to shaping the metal substrate is the present standard industrial practice.

As an added advantage, it is envisioned that a present extrusion coating composition can be used both on can ends, can bodies, and closures, thereby obviating the use of different coating compositions by container manufacturers. Furthermore, a present extrusion coating composition exhibits sufficient clarity, hardness and mar resistance after application for use as a coating on the exterior of a metal container. Accordingly, an extrusion coating composition of the present invention has a more universal range of applications, such as for the interior coating of a metal container for food or beverage products or for the exterior coating of a metal container or a material of construction, like aluminum siding, overcomes the environmental and toxicological concerns associated with a liquid coating composition, and overcomes disadvantages presented by other methods of applying a solid coating composition to a metal substrate.

SUMMARY OF THE INVENTION

The present invention is directed to extrusion coating compositions that, after application to the metal substrate, effectively inhibit corrosion of the metal substrate, do not adversely affect products packaged in a container having an interior surface coated with the composition, and exhibit excellent flexibility, barrier properties, weathering, chemical resistance, and adhesion. An extrusion coating composition of the present invention can be used on closures, can ends, and can bodies, and on container interiors and exteriors, as well as materials of construction, like aluminum siding and gutters. An extrusion coating composition effectively inhibits corrosion of ferrous and nonferrous metal substrates when the composition is extruded to a surface of the metal substrate.

A present extrusion coating composition comprises: (a) a thermoplastic polyester having a weight average molecular weight ($M_w$) of about 10,000 to about 35,000, and (b) a modifying resin, such as an epoxy or phenoxy resin having an epoxy equivalent weight (EEW) of about 500 to about 15,000. The composition is free of organic solvents.

In particular, the present extrusion coating composition comprises: (a) about 50% to about 95%, by total weight of the composition, of a polyester having an $M_w$ of about 10,000 to about 35,000, and preferably about 15,000 to about 25,000, and (b) about 5% to about 25%, by total weight of the composition material, of a modifying resin, for example, an epoxy or phenoxy resin having an EEW of about 500 to about 15,000, and preferably about 1000 to about 10,000, an acrylic resin having an $M_w$ of about 15,000 to about 100,000, or a polyolefin having an EEW of about 15,000 to about 1,000,000. A present extrusion coating composition optionally can include: (c) 0% to about 50%, by total weight of the composition, of an inorganic filler, and (d) 0% to about 4%, by total weight of the composition, of a flow control agent.

In particular, a polyester included in extrusion coating composition is a thermoplastic polyester prepared from an acid, preferably terephthalic acid, isophthalic acid, or a mixture thereof, and an aliphatic diol. The polyester most preferably is a co-polyester containing terephthalic acid and isophthalic acid. The polyester has an acid value of 0 to about 150 mg (milligram) KOH (potassium hydroxide)/g (grams) and a hydroxyl value of 0 to about 150 mg KOH/g, a softening point of 140° C. or greater, and a glass transition temperature (Tg) of about −30° C. to about 120° C. In addition, the polyester has a melt viscosity of about 10 to about 100 Pa.s (Pascal seconds) at 200° C. or about 25 to about 200 Pa.s at 240° C., and a melt flow index (MFI) of about 20 to about 800 g/10 min (minutes) at 200° C.

Components (a) and (b), and (c) and (d), if present, and other optional components are heated and intimately admixed to provide a homogenous extrusion coating composition. After cooling, the extrusion coating composition is comminuted into pellets having a particle diameter of about 1 to about 10 mm (millimeters), and preferably about 4 to about 8 mm.

As used here and hereinafter, the term "extrusion coating composition" is defined as a solid coating composition including a polyester, an epoxy resin, an optional filler, an optional flow control agent, and any other optional ingredients. The term "extruded coating composition" is defined as an adherent polymeric coating resulting from extruding an extrusion coating composition onto a metal substrate.

Therefore, one important aspect of the present invention is to provide an extrusion coating composition that effectively inhibits the corrosion of ferrous and nonferrous metal substrates. An extrusion coating composition, after extrusion onto a metal substrate, provides an adherent barrier layer of an extruded coating composition that effectively inhibits corrosion, exhibits excellent flexibility and adhesion to the metal substrate, and does not adversely affect a product, like a food or beverage, that contacts the extruded coating composition. Because of these advantageous properties, an extruded coating composition can be used to coat the interior of food and beverage containers and overcome the disadvantages associated with conventional liquid compositions and with solid compositions applied by methods such as powder coating and lamination. An extruded coating composition comprises the polyester, the modifying resin, and, if present, the filler or flow control agent essentially in the amounts these ingredients are present in the extrusion coating composition.

In accordance with another important aspect of the present invention, an extruded coating composition demonstrates excellent flexibility and adhesion to a metal substrate. The excellent adhesion of an extruded coating composition to a metal substrate improves the barrier and corrosion-inhibiting properties of the coating composition. The excellent flexibility of an extruded coating composition facilitates processing of the coated metal substrate into a coated metal article, like in molding or stamping process steps, such that the cured coating composition remains in continuous and intimate contact with the metal substrate. An extruded coating composition exhibits excellent chemical resistance and does not adversely affect a food or beverage packaged in a container having an interior surface coated with the cured coating composition. An extruded coating composition is sufficiently hard to resist scratching.

In accordance with another important aspect of the present invention, an extrusion coating composition of the present invention can be extruded onto a metal substrate to provide a uniform film of extruded coating composition having a film thickness of about 1 to about 40 microns, and preferably 2 to about 30 microns. Uniform films of such a small thickness have not been attainable using powder coating composition and methods. In addition, a present extrusion coating composition can be used both on the interior and exterior of can bodies and can ends, thereby obviating the need for a container manufacturer to use multiple coating compositions.

These and other aspects and advantages of the present invention will become apparent from the following detailed description of the preferred embodiments.

BRIEF DESCRIPTION OF THE DRAWING

FIG. 1 is a plot of viscosity vs. time for extrusion coating compositions of the present invention showing an acceptable change in viscosity over time at the melting point of the composition.

DETAILED DESCRIPTION OF THE PREFERRED EMBODIMENTS

An extrusion coating composition of the present invention, after application to a metal substrate, provides an extruded coating composition that effectively inhibits the corrosion of metal substrates, such as, but not limited to, aluminum, iron, steel and copper. An extruded coating composition also demonstrates excellent adhesion to the metal substrate, excellent chemical resistance and scratch resistance, and excellent flexibility. An extruded coating composition does not impart a taste to foods or beverages that contact the extruded coating composition.

In general, a present extrusion coating composition comprises: (a) polyester having an $M_w$ of about 10,000 to about 35,000, and (b) a modifying resin, such as an epoxy or phenoxy resin having an EEW of about 500 to about 15,000. The extrusion coating composition is a solid and is free of organic solvents. An extrusion coating composition optionally can further include: (c) a filler and (d) a flow control agent. In addition, a present extrusion coating composition can include optional ingredients that improve the esthetics of the composition, that facilitate manufacture and/or extrusion of the composition, or that improve a functional property of the composition. The individual composition ingredients are described in more detail below.

(a) Polyester

In accordance with an important feature of the present invention, an extrusion coating composition includes a thermoplastic polyester in an amount of about 50% to about 95%, by total weight of the composition. Preferably, an extrusion composition includes from about 55% to about 90%, by total weight of the composition, of a polyester. To achieve the full advantage of the present invention, an extrusion coating composition includes about 60% to about 85% of a polyester, by total weight of the composition.

The polyester is prepared from a dicarboxylic acid, preferably an aromatic dicarboxylic acid, and an aliphatic diol. These ingredients are interacted to provide a polyester having an $M_w$ of about 10,000 to about 35,000, preferably of about 15,000 to about 25,000, and to achieve the full advantage of the present invention, about 20,000 to about 25,000. Accordingly, the polyester is considered a high molecular weight polyester. The polyester has an acid number of about 0 to about 150 mg KOH/g, and preferably about 5 to about 100 mg KOH/g. The polyester has a hydroxyl number of 0 to about 150 mg KOH/g, and preferably about 5 to about 100 mg KOH/g.

Useful polyesters also possess properties that allow the polyester to be blended with the modifying resin and other composition components, to be extruded onto a metal substrate, and to provide an extruded coating composition having the necessary adhesion and flexibility to be applied to a metal substrate prior to shaping the metal substrate into a metal article. The polyester also is sufficiently nonreactive such that, when the extrusion composition is melted prior to and during extrusion, the polyester does not enter a crosslinking reaction with the modifying resin.

A polyester suitable for use in a present extrusion coating composition, provides an extruded coating composition having good film tensile strength, good permeation resistance, retortability, and good barrier properties. The polyester, and the extrusion coating composition, therefore, have a softening point of 140° C. or greater, as measured using the procedure set forth in DIN 52011. Preferably, the polyester and extrusion coating composition have a softening point of 120° C. to about 200° C. Above about 200° C., the polyester and extrusion coating composition lose flexibility, and subsequent shaping of a coated metal substrate into a metal article can cause film failure. Below 120° C., the polyester and extrusion coating composition is too soft to withstand the pasteurization and processing temperatures used by food packagers when packaging food in a metal container.

Similarly, the polyester has a Tg of about −30° C. to about 120° C., and preferably about 15° C. to about 100° C. To achieve the full advantage of the present invention, the polyester has a Tg of about 20° C. to about 80° C. In this Tg range, a polyester is sufficiently flexible to permit deformation of an extruded coating composition without forming cracks, and is sufficiently hard to exhibit excellent chemical and mar resistance. If the Tg of the polyester is below about −30° C., an extruded coating composition is too soft to provide effective chemical resistance and mar resistance. If the polyester has a Tg above about 120° C., an extruded coating composition lacks sufficient flexibility.

Useful polyesters also exhibit a melt viscosity of about 10 to about 100 Pa.s (Pascal seconds), and preferably about 20 to about 100 Pa.s, at 200° C., or about 25 to about 200 Pa.s, and preferably about 40 to about 175 Pa.s at 240° C. The melt flow index (MFI), as measured using DIN 53735, of a useful polyester is about 20 to about 800, and preferably about 25 to about 600 g/10 min at 200° C.

The polyester typically is prepared by condensing a dicarboxylic acid with an aliphatic diol. To provide a polyester having optimum properties for an extrusion coating composition for a food or beverage container, the dicarboxylic acid preferably is an aromatic dicarboxylic acid. To achieve the full advantage of the present invention, the dicarboxylic acid comprises terephthalic acid, isophthalic acid, a naphthalene dicarboxylic acid, and mixtures thereof. It is also understood that an esterifiable derivative of a dicarboxylic acid, such as a dimethyl ester or anhydride of a dicarboxylic acid, can be used to prepare the polyester.

In particular, exemplary dicarboxylic acids used to prepare a polyester include aliphatic and aromatic dicarboxylic acids, such as, but not limited to, phthalic acid, isophthalic acid, terephthalic acid, adipic acid, malonic acid, 2,6-naphthalenedicarboxylic acid, 1,5-naphthalenedicarboxylic acid, hexahydroterephthalic acid, cyclohexanedicarboxylic acid, sebacic acid, azeleic acid, succinic acid, glutaric acid, and mixtures and esterifiable derivatives thereof. Substituted aliphatic and aromatic dicarboxylic acids, such as halogen or alkyl-substitutes dicarboxylic acids, also are useful. Preferably, at least 60% mol % aromatic dicarboxylic acids are used to prepare the polyester.

Exemplary, but nonlimiting, diols used to prepare a polyester include ethylene glycol, diethylene glycol, triethylene glycol, propylene glycol, dipropylene glycol, hexylene glycol, butylene glycol, neopentyl glycol, trimethylpropane diol, cyclohexane dimethanol, a polyethylene or polypropylene glycol having a molecular weight of about 500 or less, and mixtures thereof. A small amount of a triol or polyol, i.e., 0 to 3 mole % of diol, can be used to provide a partially branched, as opposed to linear, polyester.

The diol and the dicarboxylic acid, in correct proportions, are interacted under standard esterification procedures to provide a polyester having the necessary $M_w$, molecular weight distribution, branching, crystallinity, and functionality for use in a present extrusion coating composition. Examples of useful polyesters can be prepared as set forth in Brünig et al. U.S. Pat. No. 4,012,363, incorporated here by reference, and in Canadian Patent No. 2,091,875.

In addition, useful polyesters are commercially available under the tradename DYNAPOL, from Hüls AG, Berlin, Germany. Examples of specific polyesters are DYNAPOL P1500, DYNAPOL P1510, and DYNAPOL P1550, each available from Hüls AG and based on terephthalic acid and/or isophthalic acid. Another useful polyester is GRILESTA V 79/20, available from EMS. In preferred embodiments, the present extrusion coating compositions contain a mixture of polyesters, having different molecular weights, to optimize film performance and esthetics.

A polyester also can be prepared by condensing a dicarboxylic acid or derivative of a dicarboxylic acid described above with a low molecular weight epoxy compound. The low molecular weight epoxy compound contains an average of abut 1.5 to about 2.5 epoxy groups per molecule and has an EEW of abut 150 to about 500. An exemplary low molecular weight epoxy compound is EPON 828, available from Shell Chemical Co., Houston, Tex.

(b) Modifying Resin

The extrusion coating composition also includes about 5% to about 25%, by total weight of the composition, of a modifying resin. Preferably, an extrusion composition contains about 8% to about 20% of a modifying resin, by total weight of the composition. To achieve the full advantage of the present invention, the extrusion composition contains about 8% to about 15% of a modifying resin, by total weight of the composition.

The modifying resin does not substantially react with the polyester during manufacture of the extrusion coating composition or during the extrusion process. Accordingly, after application to a metal substrate, the extrusion coating composition is not subjected a curing step. The modifying resin, however, improves the barrier properties of the extruded coating and the adhesion of the extruded coating composition to the metal substrate.

One useful modifying resin is an epoxy or phenoxy resin having an EEW of about 500 to about 15,000, and preferably about 1000 to about 10,000. To achieve the full advantage of the present invention, the epoxy or phenoxy resin has an EEW of about 2000 to about 8000. Within the above EEW range for the epoxy or phenoxy resin, the extruded coating composition is sufficiently flexible to permit deformation of an extruded coating composition without forming cracks, and is sufficiently hard to exhibit excellent chemical and mar resistance.

Preferably, the epoxy or phenoxy resin is a solid material that can be melted and admixed with a molten polyester to provide an extrusion coating composition of the present invention. Preferred epoxy and phenoxy resins contain an average of about 1.5 to about 2.5 epoxy groups per molecule of epoxy resin, but epoxy novolac resins containing greater than about 2.5 epoxy groups per molecule also can be used, i.e., containing about 2.5 epoxy groups to about 6 epoxy groups.

The epoxy or phenoxy resin can be an aliphatic resin or an aromatic resin. The preferred epoxy and phenoxy resins are aromatic, like epoxy and phenoxy resins based on the diglycidyl ether of bisphenol A or bisphenol F. An epoxy resin can be used in its commercially available form, or can be prepared by advancing a low molecular weight epoxy compound by standard methods well known to those skilled in the art.

Exemplary epoxy resins include, but are not limited to, EPON 1004, EPON 1007, and EPON 1009, all available from Shell Chemical Co., Houston, Tex., or ARALDITE® 6099, available from CIBA-GEIGY Corp., Ardsley, N.Y.

In general, suitable epoxy and phenoxy resins are aliphatic-, cycoaliphatic-, or aromatic-based epoxy resins, such as, for example, epoxy resins represented by structural formulae I and II:

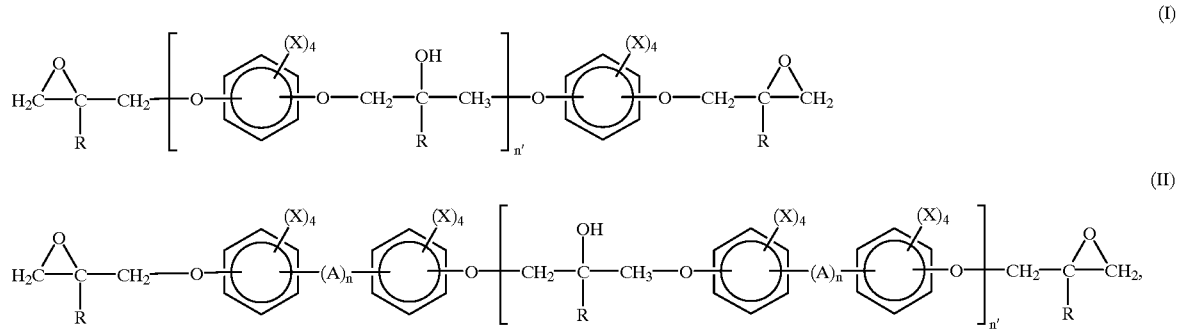

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of about 2 to about 30, and preferably 10 to about 30.

In particular, the preferred epoxy and phenoxy resins are the (diglycidyl ether/bisphenol-A) resins, i.e., polyether diepoxides prepared by the polymeric adduction of bisphenol-A (III)

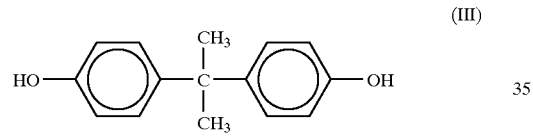

and the diglycidyl ether of bisphenol-A (IV).

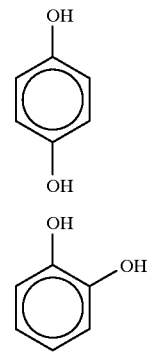

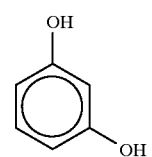

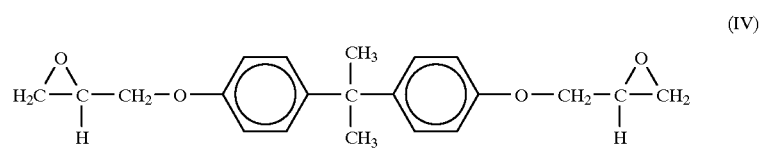

In this case, the epoxy resin is a mixture including polymeric species corresponding to different values of n' in the following idealized formula V:

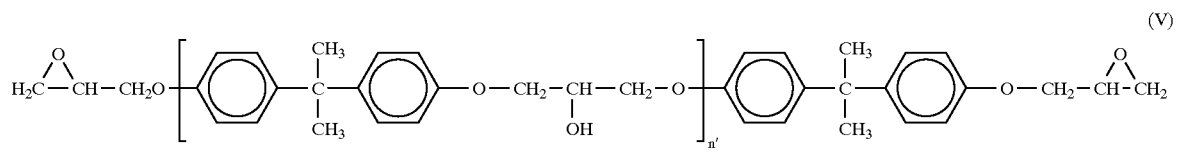

wherein n' is a number from about 2 to about 30.

In addition to bisphenol-A, useful epoxy and phenoxy resins can be prepared by advancing a diglycidyl ether of a bisphenol listed below with an exemplary, but nonlimiting, bisphenol listed below:

-continued
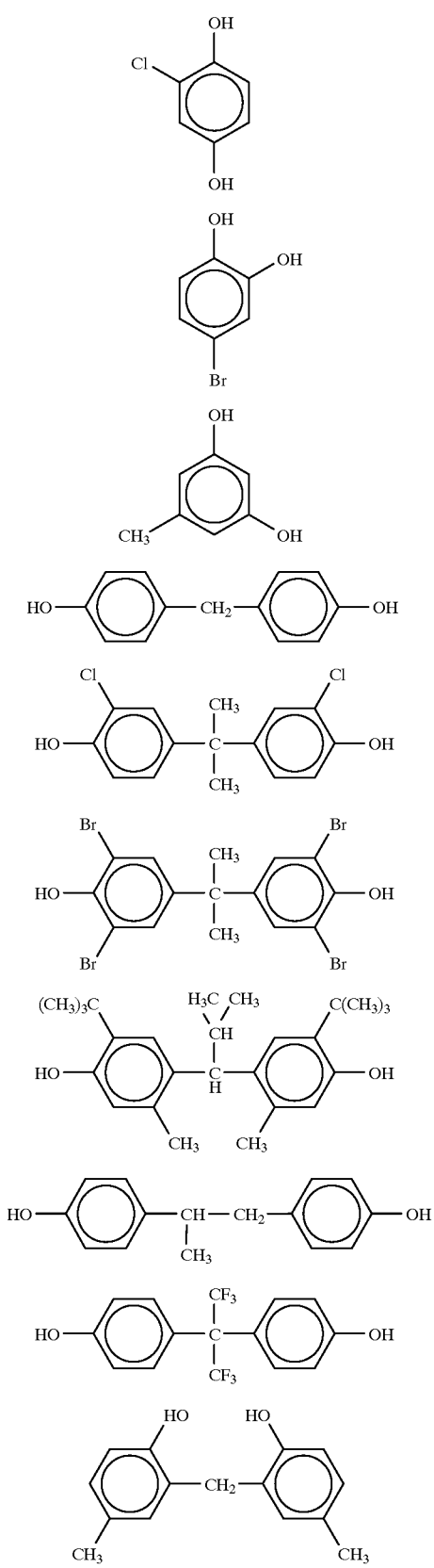
-continued
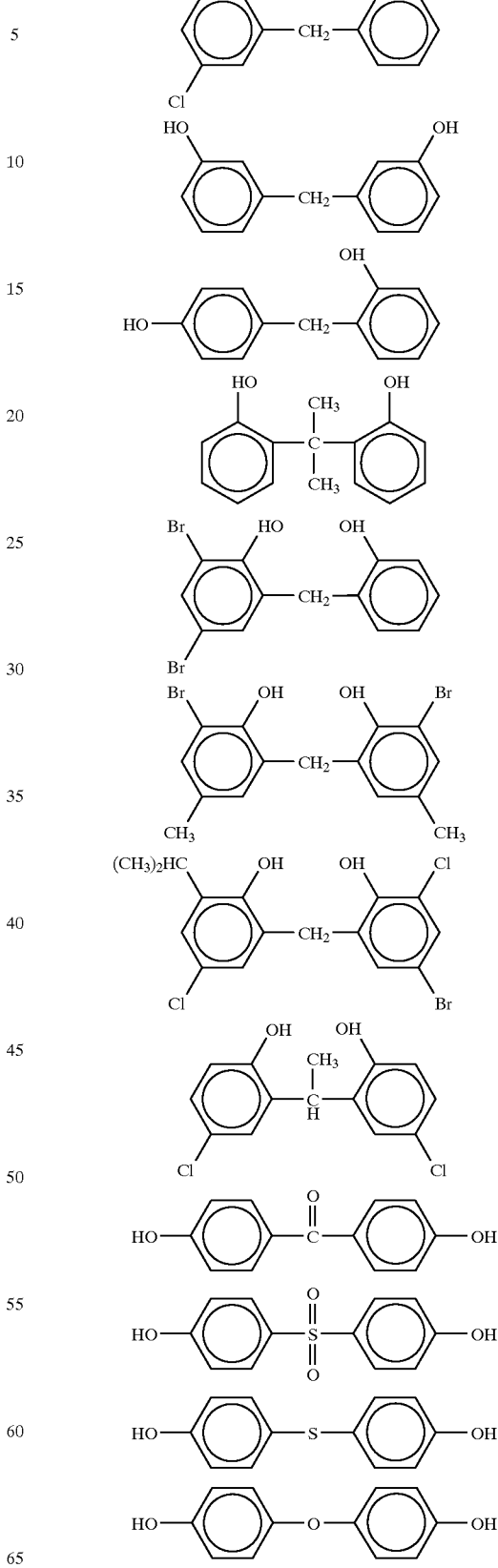

-continued

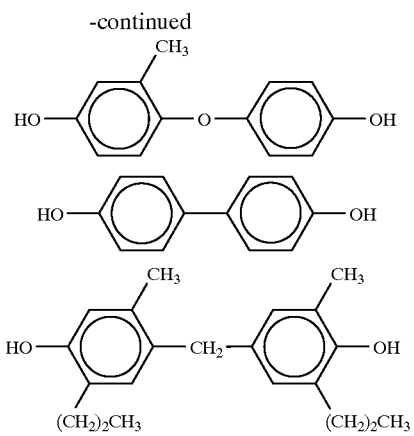

In addition to an epoxy or phenoxy resin, an acrylic resin or a polyolefin resin can be used as the modifying resin. A mixture of an epoxy resin, an acrylic resin, and a polyolefin resin also can be used. The acrylic resin has an $M_w$ of about 15,000 to about 100,000, and preferably about 20,000 to about 80,000. The polyolefin resin has an $M_w$ of about 15,000 to about 1,000,000, and preferably about 25,000 to about 750,000.

Acrylic resins include, but are not limited to, homopolymer and copolymers of acrylic acid, methacrylic acid, esters of acrylic acid, esters of methacrylic acid, acrylamides, and methacrylamides. Polyolefin resins include, but are not limited to, homopolymers and copolymers of ethylene, propylene, ethylene-propylene blends, 1-butene, and 1-pentene. The polyolefin also can contain functionalized olefins, such as an olefin functionalized with hydroxy or carboxy groups.

(c) Optional Inorganic Filler

To achieve the full advantage of the present invention, an extrusion coating composition includes 0% to about 50%, and preferably 0% to about 20%, by total weight of the composition, of an inorganic filler. An inorganic filler is included to improve the physical properties of an extruded coating composition.

Exemplary inorganic fillers used in the coating composition of the present invention include, but are not limited to, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof. The inorganic filler is essentially nonreactive and is incorporated into the extrusion coating composition in the form of a powder, generally about 10 to 200 microns in diameter, and in particular, about 50 microns to about 125 microns in diameter.

(d) Optional Flow Control Agent

An extrusion coating composition of the present invention also can contain a flow control agent to assist in achieving a uniform film of extruded coating composition on the metal substrate. The flow control agent is present in an amount of 0% to about 6%, and preferably 0% to about 5%, by total weight of the composition.

An exemplary, but nonlimiting, flow control agent is a polyacrylate available from Henkel Corporation, as PERENOL F 30 P. Numerous other compounds and other acrylic resins known to persons skilled in the art also can be used as a flow control agent.

(e) Other Optional Ingredients

An extrusion coating composition of the present invention also can include other optional ingredients that do not adversely affect the extrusion coating composition or an extruded coating composition resulting therefrom. Such optional ingredients are known in the art, and are included in an extrusion coating composition to enhance composition esthetics, to facilitate manufacturing and application of the extrusion coating composition, and to further improve a particular functional property of an extrusion coating composition or an extruded coating composition resulting therefrom.

Such optional ingredients include, for example, dyes, pigments, anticorrosion agents, antioxidants, adhesion promoters, light stabilizers, and mixtures thereof. Each optional ingredient is included in a sufficient amount to serve its intended purpose, but not in such an amount to adversely affect an extrusion coating composition or an extruded coating composition resulting therefrom.

For example, a pigment, in an amount of 0 to about 50% by weight of the composition, is a common optional ingredient. A typical pigment is titanium dioxide, barium sulfate, carbon black, or an iron oxide. In addition, an organic dye or pigment can be incorporated in the extrusion coating composition.

In addition, an additional polymer, i.e., a second modifying polymer, can be added to the extrusion coating composition to improve the properties of the extruded coating composition. The second modifying polymer preferably is compatible with the other composition components and must not adversely affect the extruded coating composition. To achieve a coated metal substrate having a nongloss finish, the second modifying polymer can be substantially imcompatible with the polyester and modifying polymer. The second modifying polymer can be a thermoplastic or a thermoset polymer, and is present in the extrusion coating composition in an amount of 0 to about 50%, and preferably 0% to about 20%, by total weight of the composition.

Nonlimiting examples of second modifying polymers that can be incorporated into the extrusion coating composition are a carboxylated polyester or polyolefin, a polyamide, a fluorocarbon resin, a polycarbonate, a styrene resin, an ABS (acrylonitrile-butadiene-styrene) resin, a chlorinated polyether, a urethane resin, and similar resins. Polyamide resins include nylon 66, nylon 6, nylon 610, and nylon 11, for example. Polyvinyl chloride includes homopolymers and copolymers, for example, with ethylene or vinyl acetate, for example. Fluorocarbon resins include tetrafluorinated polyethylene, trifluorinated monochorinated polyethylene, hexafluorinated ethylene-propylene resin, polyvinyl fluoride, and polyvinylidene fluoride, for example. However, even if an additional polymer is added to the extrusion coating, the extrusion coating composition is free of a crosslinking agent and is not subjected to a curing step after extrusion onto a metal substrate.

An extrusion coating composition of the present invention can be prepared by methods well known in the art, such as by individually heating the polyester and the epoxy resin to a sufficient temperature to melt each ingredient, then admixing the molten polyester and epoxy resin, such as in a single screw or double screw extruder, to provide a uniform extrusion coating composition. Optional ingredients can be added to the extrusion coating composition either by incorporation into one of the molten ingredients prior to admixture of the molten ingredients, or can be added to the molten extrusion coating composition after ingredients have been admixed. If an optional additional polymer is present in the composition, the additional polymer is melted and added to the molten extrusion coating composition at any convenient step of the manufacturing process. Alternatively, all ingredients can be admixed in the solid state, followed by melting the resulting admixture and extrusion, to provide a uniform molten composition.

After a uniform molten composition is prepared, the extrusion coating composition is allowed to cool and solidify. The resulting extrusion coating composition then is formed into pellets having a particle diameter of about 1 to about 10 mm. The pellets are stored and kept dry until use in an extrusion process. Preferably, the pellets are subjected to a heating step prior to extrusion in order to expel any water absorbed by the extrusion coating composition during storage.

To demonstrate the usefulness of a waterborne coating composition of the present invention, the following examples were prepared, then extruded onto a metal substrate to provide a coated metal substrate. The coated metal substrates then were tested for use as a food or beverage container. The extruded coatings were tested for an ability to inhibit corrosion of a metal substrate, for adhesion to the metal substrate, for chemical resistance, for flexibility, and for scratch and mar resistance. Examples 1 through 9 illustrate important features and embodiments of an extrusion coating composition of the present invention, and illustrate methods of extruding a coating composition of the present invention.

EXAMPLE 1

| Ingredient | Amount (wt. %) |
|---|---|
| Polyester[1] | 81.37 |
| Epoxy Resin[2] | 8.13 |
| Barium Sulfate | 10.00 |
| Flow Control Agent[3] | 0.50 |

[1]DYNAPOL P1500, available from Hüls AG, having softening point of 170–176° C., a Tg of about 23° C., and a melt viscosity of about 70–80 Pa · s at 240° C.;
[2]ARALDITE ® 6099, available from CIBA-GEIGY having an EEW of about 2500 to about 4000; and
[3]PERENOL F30P, available from Henkel Corporation.

The extrusion coating composition of Example 1 was prepared by melting the polyester and adding the barium sulfate and the flow control agent, with stirring, to the molten polyester. The resulting mixture was heated to maintain the polyester in the molten state. Then, the previously melted epoxy resin was admixed with the molten polyester by passing the epoxy resin and polyester through a twin blade extruder. The resulting composition of Example 1 was allowed to cool to room temperature and solidify. The solid composition then was formed into pellets, the majority having a particle diameter of about 1 to about 10 mm. The extrusion coating composition of Example 1 had a melt flow index (MFI) of 62.2 g/10 minutes at 200° C., and a melting peak of 172.2° C. (determined by differential scanning calorimetry (DSC)).

EXAMPLE 2

| Ingredient | Amount (wt. %) |
|---|---|
| Polyester[1] | 90.55 |
| Epoxy Resin[2] | 8.90 |
| Flow Control Agent[3] | 0.55 |

The composition of Example 2 was prepared in an essentially identical manner to the composition of Example 1, except barium sulfate is omitted from the composition. The solid composition of Example 2 was formed into pellets, the majority having a particle diameter of about 1 to about 10 mm. The extrusion coating composition of Example 2 had a melt flow index (MFI) of 66.2 g/10 minutes at 200° C., and a melting peak of 170.7° C. (determined by DSC).

EXAMPLE 3

| Ingredient | Amount (wt. %) |
|---|---|
| Polyester[1] | 36.0 |
| Polyester[4] | 36.0 |
| Epoxy Resin[2] | 7.5 |
| Barium Sulfate | 5.0 |
| Flow Control Agent[3] | 0.5 |
| Titanium Dioxide | 8.0 |
| Aluminum Silicate | 4.0 |
| Mica | 3.0 |

[4]DYNAPOL 1510, available from Hüls AG, having a melting point of 147–154° C., a Tg of about 23° C., a melt viscosity of 35–40 Pa · S at 240° C., and a melt index of about 120 g/10 min at 200° C.

The composition of Example 3 was prepared in an essentially identical manner to the composition of Example 1, except additional fillers and pigments were incorporated into the composition. The solid composition of Example 3 then was formed into pellets, the majority having a particle diameter of about 1 to about 10 mm. The extrusion coating composition of Example 3 had a melt flow index (MFI) of 86.9 g/10 minutes at 200° C., and a melting peak of 171.9° C. (determined by DSC).

EXAMPLE 4

| Ingredient | Amount (wt. %) |
|---|---|
| Polyester[5] | 90.411 |
| Epoxy Resin[2] | 9.033 |
| Flow Control Agent[3] | 0.556 |

[5] DYNAPOL 1550, available from Hüls AG.

The composition of Example 4 was prepared in an identical manner to the composition of Example 2. The solid composition then was formed into pellets, the majority having a particle diameter of about 1 to about 10 mm.

EXAMPLE 5

| Ingredient | Amount (wt. %) |
|---|---|
| Polyester[4] | 23.370 |
| Polyester[5] | 46.780 |
| Epoxy Resin[2] | 16.304 |
| Barium Sulfate | 5.435 |
| Flow Control Agent[3] | 0.543 |
| Aluminum Silicate | 4,348 |
| Mica | 3.261 |

[5]GRILESTA V 79/20, a polyester, available from EMS, having a density of 1.29 g/cm³, a melting point of about 15° C., a Tg of about 25° C., and a melt viscosity of about 200 Pa · S at 200° C.

The composition of Example 5 was prepared in an identical manner to the composition of Example 3. The solid composition of Example 5 then was formed into pellets, the majority having a particle diameter of about 1 to about 10 mm. The extrusion coating composition of Example 5 had a melt flow index (MFI) of 80.3 g/10 minutes at 200° C., and a melting peak of 158.2° C. (determined by DSC).

EXAMPLE 6

| Ingredient | Amount (wt. %) |
|---|---|
| Polyester[4] | 24.713 |
| Polyester[5] | 49.425 |
| Epoxy Resin[2] | 17.241 |

EXAMPLE 6-continued

| Ingredient | Amount (wt. %) |
| --- | --- |
| Flow Control Agent[3] | 0.576 |
| Aluminum Silicate | 4.598 |
| Mica | 3.448 |

The composition of Example 6 was prepared in an identical manner to the composition of Example 3. The solid composition then was formed into pellets, the majority having a particle diameter of about 1 to about 10 mm. The extrusion coating composition of Example 6 had a melt flow index (MFI) of 92.2 g/10 minutes at 200° C., and a melting peak of 159.9° C. (determined by DSC).

EXAMPLE 7

| Ingredient | Amount (wt. %) |
| --- | --- |
| Polyester[4] | 21.5 |
| Polyester[5] | 43.0 |
| Epoxy Resin[2] | 15.0 |
| Barium Sulfate | 5.0 |
| Flow Control Agent[3] | 0.5 |
| Titanium Dioxide | 8.0 |
| Aluminum Silicate | 4.0 |
| Mica | 3.0 |

The composition of Example 7 was prepared in an identical manner to the composition of Example 3. The solid composition then was formed into pellets, the majority having a particle diameter of about 1 to about 10 mm. The extrusion coating composition of Example 6 had a melt flow index (MFI) of 96.8 g/10 minutes at 200° C., and a melting peak of 157.3° C. (determined by DSC).

EXAMPLE 8

| Ingredient | Amount (wt. %) |
| --- | --- |
| Polyester[4] | 0.435 |
| Polyester[5] | 56.087 |
| Epoxy Resin[2] | 13.043 |
| Flow Control Agent[3] | 1.739 |
| Titanium Dioxide | 13.043 |
| Aluminum Silicate | 13.043 |
| Mica | 2.609 |

The composition of Example 8 was prepared in an identical manner to the composition of Example 3. The solid composition then was formed into pellets, the majority having a particle diameter of about 1 to about 10 mm. The extrusion coating composition of Example 8 had a melt flow index (MFI) of 66.5 g/10 minutes at 200° C., and a melting peak of 157.8° C. (determined by DSC).

EXAMPLE 9

| Ingredient | Amount (wt. %) |
| --- | --- |
| Polyester[4] | 21.5 |
| Polyester[5] | 43.0 |
| Epoxy Resin[2] | 15.0 |
| Flow Control Agent[3] | 0.5 |
| Titanium Dioxide | 15.0 |
| Aluminum Silicate | 3.0 |
| Mica | 2.0 |

The composition of Example 9 was prepared in an identical manner to the composition of Example 3. The solid composition then was formed into pellets, the majority having a particle diameter of about 1 to about 10 mm. The extrusion coating composition of Example 9 had a melt flow index (MFI) of 86.3 g/10 minutes at 200° C., and a melting peak of 159.3° C. (determined by DSC).

Extrusion coating compositions of the present invention were extruded onto a metal substrate to provide a coated metal substrate having an adherent barrier layer of an extruded composition. Typically, the compositions are applied to a sheet or coil of a metal substrate moving relative to an extruder which applies the composition to the metal substrate. The extruder comprises a screw to transfer the molten composition, and a die to apply the composition to the metal substrate at a predetermined thickness. The extruder applies the extrusion coating composition to the metal substrate as a layer of about 1 to about 40, and preferably about 2 to about 30, microns. To achieve the full advantage of the present invention, the extruded coating composition is about 1 to about 10 microns thick.

The coated metal substrates then were tested for use as the interior surface of a food or beverage container. As will be demonstrated more fully hereafter, an extruded coating composition resulting from extruding an extrusion coating composition of the present invention is suitable as the interior coating of a metal container for food or beverages. A present extrusion coating composition provided excellent extruded coatings in the absence of a curing step.

In particular, an extrusion coating composition of the present invention can be applied to essentially any metal substrate. Nonlimiting examples of metal substrates are aluminum, tin-free steel, tinplate, steel, zinc-plated steel, zinc alloy-plated steel, lead-plated steel, lead alloy-plated steel, aluminum-plated steel, aluminum alloy-plated steel, and stainless steel.

In the extrusion coating method, the extrusion coating composition is slowly and carefully melted by first heating the composition at about 100° C. to about 120° C., then slowly increasing the temperature to about 180° C. to about 240° C. to completely melt the extrusion coating composition. The upper temperature is not especially limited, but must be sufficiently high to melt the composition. The composition should not be heated to a temperature far above the melting point (i.e., greater than about 100° C. above the melting point) in order to avoid undesirable reactions between the polyester and the modifying resin, or degradation of the polyester.

An important feature of the present extrusion coating compositions is stability of the composition at the melting point temperature. FIG. 1 illustrates that extrusion coating compositions of the present invention increase in viscosity by less than 100 Pa.s when maintained at, or above, the melting point for twenty minutes. This slight increase in viscosity shows that the polyester and epoxy are not reacting, i.e., undergoing cure, at the melting point to form a crosslinked resin, and that the polyester is not degrading. If crosslinking did occur, the viscosity would rise dramatically, and it would be difficult to impossible to extrude the extrusion coating composition onto a metal substrate. A decrease in viscosity indicates that the polyester was degrading at the melting point.

In addition, the metal is heated prior to extrusion to a temperature of about 120° C. to about 250° C. Preheating of the metal substrate is important to achieve sufficient flow of the extrusion coating composition on the metal substrate, and to achieve adhesion of the extruded composition to the metal substrate.

The extrusion coating composition does not cure or crosslink to any substantial extent during, or after, extrusion onto the heated substrate. Therefore, a step of curing the extruded composition at an elevated temperature is omitted. However, to optimize the properties of the extruded composition, the coated metal substrate, after cooling, preferentially is subjected to a post-extrusion heating step conducted at about 250° C. to about 550° C. for about 5 to about 30 seconds, and preferably about 300° C. to about 500° C. for about 10 to about 20 seconds.

The resulting extruded coating compositions had a smooth, glossy appearance, and were defect free. The extruded coatings had good adhesion and exhibited good barrier and anticorrosion properties.

In particular, the present extrusion coating compositions provide a highly protective, self-lubricating layer when extruded onto a metal substrate. The compositions can be extruded onto metal coils or sheets at a high speed to provide a layer of extruded composition having a thickness of about 1 to about 40 microns, preferably about 2 to about 30 microns. For many applications, the extruded composition has a thickness of about 1 to about 10 microns. Typically, the extruder has a length-to-diameter ratio (L/D) of about 10:1 to about 30:1, and preferably about 15:1 to abut 25:1. The extruder can contain a single screw, or twin screws, either conrotatory or counter rotatory. The extruded composition outperforms liquid and powder coating compositions, and reduces the cost of applying a thin protective coating on a metal substrate.

Overall, an extrusion coating composition of the present invention demonstrates the advantages of eliminating chemical pretreatment of the metal substrate; substituting the use of a small induction oven for preheating the metal substrate and for postheating in place of a large convection oven for drying a liquid composition; using a solid composition containing no organic compounds in place of a liquid containing organic solvents; elimination of lubricating stations; and elimination of solvent incinerators.

Various tests were performed on the extrusion coating compositions. In one test, extrusion coating compositions were subjected to a batch mixer test. The batch mixer uses a pair of roller type blades to mix the composition in a 50 cc (cubic centimeter) chamber. The batch mixer measures torque versus time and operating temperature. A "torque vs. time" curve is a measure of the processability of the composition, and the change of torque can be interpreted as a rate, for example, a rate of degradation or rate of crosslinking.

In this test, the mixer first was preheated to the experimental temperature. The equipment was calibrated to zero torque at experimental rotational speed and temperature. A sample of the test composition (70% of the mixer volume) was added, and the torque (in meter gram) was measured against time and temperature. Specifically, the compositions of Examples 1 and 3 were compared to a control of a commercial low density polyethylene (i.e., CHEVRON 1017). In the batch mixer test, the compositions of Examples 1 and 3, like the control, were stable at 200° C. for at least 10 minutes. The compositions of Examples 1 and 3 were less viscous (i.e., had lower torque) than the control.

The composition of Example 3 also was extruded onto an aluminum substrate. Test results indicated that good film properties were obtained. In particular, the film was flexible, had good adhesion to the substrate, as shown in water pasteurization, boiling DOWFAX and reverse impact tests, and had a low enamel rating.

The composition of Example 3 also was extruded onto other metal panels, and the panels were subjected to a retort test to determine whether the extruded coating composition could withstand the high temperatures encountered during food processing. In particular, the coated metal substrates were subjected to dog food, cat food, or tomato products for 90 minutes at 250° F. and 15 psi. The composition of Example 3, extruded onto tin-free steel or aluminum, withstood the retort test, and can be used for food packaging. It was found that a postheating step (i.e., after extrusion) provided a coated substrate having better adhesion, antistain, and antiblistering properties than coated substrates that were not post-heated. In addition, coextrusion of the composition of Example 3 with a layer of polymer to improve adhesion to metal (i.e., DuPont Bynel) provided a coated substrate having good intercoat adhesion.

In another test, the composition of Example 3 was coated onto sheets of tin-free steel (thickness 0.19 mm). Six sheets had an extruded coating thickness of 25 microns (Sheets A), and six sheets had a coating thickness of 20 microns (Sheets B). Sheets A and B were postheated at 500° F. for about 12 seconds.

The Sheets A and B were tested and found to have excellent film flexibility and adhesion, and a low film porosity. The coated sheets were retortable in deionized water at 121° C. for one hour. Accordingly, the composition of Example 3 is suitable for use on the exterior of a metal food can. The sheets also were found suitable for the exterior and interior of metal cans holding an acidic product, like applesauce (i.e., passed 30 minute retort test at 100° C.). Sheets A and B showed insufficient retortability at 121° C. for 1 hour in the presence of a polyphosphate. The following Table 1 summarizes the test results.

TABLE 1

|  | Sheets A | Sheets B |
|---|---|---|
| Film[1] Thickness | 19–26 microns | 19–23 microns |
| Appearance | craters present, but not to the metal | craters present, but not to the metal |
| Wedge Bend | 100/100 | 100/100 |
| 4 Corner Test | 0 | 0 |
| Cup/Beading | 0/>1.2 mm | 0/>1.2 mm |
| 2 min. CuSO$_4$ Soln. | 4 pores | 30 pores |
| -- 4 corner Sterilization 1 hour @ 121° C. | no porosity on corner | no porosity on corner |
| Solution-D--surface | OK | OK |
| -- GT/DT | 0/>1000 | 0/>1000 |
| -- 4 Kant-D | 0 | 0 |
| Solution S--surface | Flat--no gloss | Flat--no gloss |
| -- GT/DT | 0/950 | 0/1000 |
| -- 4 Kant-D | 0; on all 4 corner | 0; on all 4 corner-Blister |
| Solution R-surface | Flat--blush | Flat-blush |
| -- GT/DT | 0/800 | 0–1/600 |
| -- 4 Kant-D | 0 | 0 |
| Solution O--surface | Flat-blush/staining | Flat-blush/staining |
| -- GT/DT | 0/1000 | 0/700 |
| -- 4 Kant-D | 0 | 0 |

[1]Composition of Example 3;
[2]Abbreviations and rating scale:
0 Excellent
1 Good
GT Cross Hatch
DT Duro Test
D Demineralized water
S Acetic acid solution
R Citric acid solution
D Citric acid solution.

Overall, Sheets A and B exhibit a better overall performance than a metal substrate coated with a liquid coating composition.

In another test, the composition of Example 3 was applied to an aluminum substrate and to a tin-free steel substrate at a line speed of 400 fpm (feet per minute). The temperature of the substrate at 3.5 fpm was 190° C., and the estimated temperature of the substrate at 400 fpm was 170° C. The thickness of the extruded coating on aluminum (Sheet C) was 5 to 8 microns. The thickness of the extruded coating on tin-free steel (Sheet D) was 7 to 11 microns. Sheet C and Sheet D were postheated to improve adhesion. The sheets were not quenched after postheating.

Sheets C and D were drawn to form metal containers and ends. About two-thirds of the ends were reheated. One-half of the reheated ends were cooled slowly, and one-half were quenched.

The integrity of the extruded composition on the flat and the formed regions of the can ends was evaluated by performing enamel rating and copper chloride pinhole tests on five formed can ends. The results are summarized in Table 2.

that reheating the formed end can degrade the coating and lead to decreased performance. The formed ends having an extruded coating of Example 3 resisted blushing and successfully passed the wet tape test.

Tables 4 and 5 summarize the results of tests performed on cans made from aluminum sheet coated with the extrusion coating composition of Example 3. Several cans were prepared using different combinations of film thickness and cooling mechanisms (i.e., quench or no quench). Individual cans were tested for adhesion, pinholing, and resistance to heating.

TABLE 2

Performance of Coated Ends

| | | | | Number of Pinholes at Various Locations of the End | | | | | | |
|---|---|---|---|---|---|---|---|---|---|---|
| Coating | Thickness (microns) | Quench | Average Enamel Rating | Chuck Wall | Lettering | Score | Face | Rivet | Edge of Finger Panel | C-Bead |
| Example 3 | 7.4 ± 1.5 | No | 43 ± 35 | many | 5 | 1 | 4 | 0 | 0 | None detected |

Adhesion tests also were performed. The results of the adhesion test are summarized in Table 3. The extruded composition of Example 3 demonstrated excellent adhesion and was sufficiently hard to resist the effects of food and beverages stored in a metal container.

TABLE 3

Performance Evaluation of Coated Ends

| | Thickness | | DOWFAX | | Hot Water | | Wet Tape (pressure cooker) | | | |
|---|---|---|---|---|---|---|---|---|---|---|
| Coating | (microns) | Quench | Adh. | Bl. | Adh. | Bl. | Adh. | Bl. | Feathering | Pencil Hardness |
| Example 3 | 8 | no | 0[2] | 0 | 0 | 0 | 0 | 0 | 0 | 3H |
| Example 3 | 8 | no[1] | 0 | 1 | 0 | 1 | 0 | 1 | (could not open) | 3H |
| Example 3 | 8 | yes[1] | 0 | 0 | 0 | 0/2 | 0 | 1 | (could not open) | 3H |

[1]Ends were postheated after being formed;
[2]Best = 0, Failure = 5.

The ends coated with Example 3 and that were not reheated performed especially well. It has been theorized

TABLE 4

Performance Evaluation of Coated Bodystock

| | Thickness | | DOWFAX | | Hot Water | | Wet Tape (pressure cooker) | | | | Pencil |
|---|---|---|---|---|---|---|---|---|---|---|---|
| Coating | (microns) | Quench | Adh. | Bl. | Adh. | Bl. | Adh. | Bl. | Pinholes | Feathering | Hardness |
| Example 3 | 7 | no | 0 | 0 | 0 | 0 | 0 | 0 | —on wall —no ring | yes | <2B[1] |
| Example 3 | 11 | no | 2 | 0 | 0 | 0 | 2 | 0 | —on wall —no ring | no | <2B[1] |

[1]Coatings were thin and slightly rough so all the pencils penetrated.

TABLE 5

Effect of Baking Precoated Cans
(held at 200° C. for 2 minutes, PMT 188–193° C.

| Coating | Reflow | Hot Water | | DOWFAX | | Feathering | Pinholes |
| | | Adh. | Bl. | Adh. | Bl. | | |
|---|---|---|---|---|---|---|---|
| Example 3 | no | 0 | 0 | 0 | 0 | yes | —on wall, —no ring |
| 7 microns (11 microns for pinholes) | yes | 0 | 0 | 0 | 0 | no | —on wall —ring near bottom |

Cans coated with the extrusion coating composition of Example 3 performed very well, especially in comparison to other solids compositions. It also was found that reheating the cans significantly improved the performance of an extruded composition of Example 3.

Extrusion coating compositions of the present invention, i.e., the compositions of Examples 3 and 7, were extruded onto an aluminum substrate, and the resulting extruded coating was compared to a film of Example 3 applied to an aluminum substrate in a powder coating method and to a commercial, solvent-based thermoset polyester-based composition applied to an aluminum substrate as a liquid. Test results are set forth in Table 6.

TABLE 6

Comparison Between Extrusion Coating, Powder Coating, and Liquid Composition

| Test | Example 3[1] (extrusion) | Example 3[2] (powder coating) | Example 7 (extrusion) | Liquid[3] Composition |
|---|---|---|---|---|
| Film Thickness (microns) | 4–18 (average 8) | 27–31 | 39–42 | 5–7 |
| 4-Kant Dose | no imperfections | no imperfections | no imperfections | no imperfections |
| Solution tests on 4-Kant Dose | | | | |
| D | slight blush, good adhesion | bubbles formed on corners and flat surfaces | small bubble formation | no imperfections |
| S | bubbles formed | adhesion loss on all corners and flat surfaces | small bubble formation | adhesion less |
| R | slight blush, good adhesion | adhesion loss on all corners and flat surfaces | small bubble formation | bubble formation |
| O | slight blush, good adhesion, small white spots | surface bubbles, adhesion loss at one corner | small bubble formation | bubble formation |
| Mi | strong blush, bubbles formed, adhesion loss | complete adhesion loss | bubble formation, adhesion loss | slight blush |
| Cy | good adhesion, stripe blush | 2 corners and 50% of flat surface lost adhesion | no imperfections | slight imperfection |
| NaCl/HAc | bubble formation | bubble formation, complete adhesion loss | bubble formation at 2 corners | blush and bubble formation |
| Civo-Test | microbubbles formed | all corners lost adhesion, big bubble formation | bubble formation, adhesion loss | bubble formation |

[1] composition used in the example;
[2] composition of Example 3 ground into a fine powder capable of being applied as a powder; and
[3] an organic solvent-based coating composition containing a thermosetting polyester and a crosslinker.

The comparative data in Table 6 shows that an extruded coating outperformed a powder coating of the same composition, and that the extruded coating was much thinner, i.e., about 2 to 3 times thinner, than the powder coating. The extruded coating, therefore, provides better barrier protection using a thinner coating, which greatly enhances the economics of the coating process. The extruded, thermosetting composition of Example 3 also performed favorably in comparison with the liquid, thermosetting composition.

The present extrusion coating compositions exhibited coating properties at least equal to current commercial compositions used for similar practical applications. The data summarized above illustrates that an extrusion coating composition of the present invention provides an extruded coating composition useful on the interior or exterior coating of a food or beverage container.

In particular, a coating composition for a metal container must demonstrate excellent adhesion and flexibility because metal containers are manufactured by first coating flat sheets of the metal substrate, then forming the coated sheets into a desired shape. Coatings having poor adhesion properties can separate from the metal substrate during the shaping process. A lack of adhesion, therefore, can adversely affect the ability of the cured coating composition to inhibit corrosion of the metal substrate. A present extrusion coating composition exhibits an excellent adhesion to a metal substrate, and, therefore, a coating can be extruded onto a metal substrate, and the metal substrate subsequently can be deformed without adversely affecting continuity of the coating film.

The extruded coating compositions have excellent flexibility. Flexibility is an important property of a polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present extrusion coating composition were deformed into the shape of a metal can. No cracks or fractures were observed. In addition, as previously described, an extruded coating provided by an extrusion coating composition of the present invention is sufficiently adherent to the metal substrate, and remains sufficiently adherent during processing into a metal article, and, therefore, further enhances corrosion inhibition.

The tests summarized in Tables 1–6 demonstrate that a present extruded coating composition maintains adhesion to the metal substrate, is flexible, is sufficiently hard, and, therefore, is scratch and mar resistant, resists blush, and resists chemical attack. Such a combination of advantages are necessary, or ate least desirable, in a coating applied to the interior of food and beverage containers.

The above-described advantages made an extrusion coating composition of the present invention useful for application on the interior or extrusion surface of a variety of metal articles, such as for the interior of metal containers for foods and beverages. A present extrusion coating composition is especially useful as a coating on a metal container that holds taste-sensitive foods or beverages, like beer, because the extruded coating composition is essentially free of components that affect the taste of the food or beverage.

The above-described tests performed on metal substrates coated with an extrusion coating composition of the present invention are well known to persons skilled in the art and are summarized as follows:

DOWFAX Test

Coated samples were immersed in a boiling 1.67% aqueous solution of DOWFAX 2A1 surfactant for 15 minutes, rinsed in hot water, and dried. The samples then were crosshatched, taped, and rated for adhesion according to the following system:

0—perfect
1—very slight pickoff from edges of squares
2—slight pickoff (1–2%)
3—moderate pickoff (2–50%)
4—severe pickoff (>50%)
5—very severe, crosshatching removes the coating.

The samples also were rated for blushing as follows:

0—perfect
1—very slight haze on surface
2—slight cloudy appearance
3—moderate cloudy appearance
4—very cloudy and dull appearance, possible discoloration.

The blush resistance test demonstrates the ability of an extruded coating to resist attack by a hot detergent solution. Adhesion is tested by the crosshatch adhesion test wherein razor blades make perpendicular crosshatch patterns in a cured coating. Adhesive tape is applied to the crosshatch patterns, then the adhesive tape is removed at a 90° angle in a fast movement. The amount of extruded coating remaining as the metal substrate then is determined.

Wet Tape Test

Coated samples were immersed in water in a pressure cooker for one hour at 15 psi. The samples were rated as in the DOWFAX test.

Hot Water Test

Coating samples were immersed in water for 30 minutes at 65° C. The samples were rated as in the DOWFAX test.

Pinhole Test

For flat sheet, a circle of plasticine (usually about 50 cm$^2$) was placed firmly on a coated sample. The area inside the circle was filled with 2% (wt/v) copper chloride and left for several hours. The samples were then examined for reddish deposits indicating the presence of pinholes in the coating. Converted ends were placed upside down and the copper chloride solution was placed in the cavity formed by the countersink.

Feathering Test

Coupons (usually around 50 cm$^2$) were placed in 65° C. water for 15 minutes. Two 45° slits were made about 3 cm apart on one edge so that they point towards each other and the metal outside the slits was placed in a clamping device. The free metal between the two slits was grabbed sideways using pliers and twisted to roll up a triangular piece of metal from the coupon. The metal edges on the coupon then were examined for overhanging coating. No overhanging coating is a perfect rating of 0.

Diet Sprite and Gatorade Tests

Four individual samples of a coated metal substrate were placed in beakers containing Lemon-Lime Gatorade (a drink used by athletes containing a large amount of salt) or Diet Sprite (a carbonated citrus flavored beverage). The beakers were covered and one with each drink was stored at 65° C. and 82° C. for seven days. The samples then were evaluated for adhesion and blushing as in the DOWFAX test. The samples were examined for blistering and pencil hardness.

The rating for blistering is as follows:

0—perfect, no blisters
1—blisters present (<⅙ cm$^2$) or rough surface
2—few blisters
3—many blisters, but not completely covering the surface
4—coating is completely blistered and following apart.

Pencil Hardness

The samples were rated for pencil hardness by scratching the coating with pencils of different hardness. The hardest pencil not penetrating the surface is the rating given to the coating. The pencils range from 4H, which is the hardest, to 2B, which is the softest, with 3H, 2H, H, F, HB, B in between.

| Processing Test Solutions | |
| --- | --- |
| Solution D | Demineralized water |
| Solution S [1] | 40 g concentrated acetic acid |
| | 24 g gelatin |
| | 24 g sodium chloride |
| | 0.4 g crystalline sodium sulfide (Na$_2$S · 9 H$_2$O) |
| | q.s. water to about 800 ml |
| Solution R [1] | 16 g citric acid crystals |
| | 3.2 g vitamin C (ascorbic acid) |
| | q.s. water to about 800 ml |
| Solution O [1] | 16 g citric acid crystals |
| | 0.2 g H$_2$O$_2$ hydrogen peroxide (30% sol.) |
| | 0.8 g NH$_4$NO$_3$ ammonium nitrate |
| | q.s. water to about 800 ml |

[1] The test solutions D, S, R, O have been chosen for cans containing a wide variety of food filling; these tests are conducted for 1 hour at 121° C.

Water Pasteurization

After immersion in 180° F. water for 30 minutes, the coated panels were tested for 25 lb. reverse impact, blush, and pencil hardness.

Retort Test

The retort test was performed to evaluate the resistance and adhesion of coatings under food processing conditions (90 minutes @250° F. and 15 psi).

Enamel Rating (ER)

The enamel rating tests the continuity of a coating film applied to a can part, such as a can end or a can body. The enamel rating test measures the passage of current from an electrode through an electrolyte to the formed can part. The coating functions as an insulator, and, accordingly, no current flows if film continuity is perfect. The lower the milliamp (mA) reading, the more continuous the coating on the metal substrate.

4-Kant Dose

This is a shallow, drawn can body of approximately rectangular shape. Each of the four corners is curved, and each curved corner has a different diameter. The 4-Kant Dose is prepared from a metal substrate having a coating applied thereon before the can body is formed.

Mi (Lactic Acid), Cy (Cysteine) and NaCl/HAC (Sodium Chloride/Acetic Acid) Tests A coated substrate is formed into a 4-Kant Dose container, then a test solution is added to the 4-Kant Dose and held at 120° C. for one hour. The lactic acid solution is a 1% aqueous lactic acid solution. The cysteine solution contains 0.45 g cysteine and about 10 g of phosphate per liter of aqueous solution. The NaCl/HAC solution contains 2% sodium chloride and 3% acetic acid in water.

Civo-Test

A 4-Kant Dose container is placed in a larger container, and the larger container is filled with a 3% aqueous acetic acid solution. The large container is heated to 70° C. and held for two hours. The container then is cooled, and stored for 10 days at 40° C. The 4-Kant Dose container then is inspected for defects.

Obviously, many modifications and variations of the invention as hereinbefore set forth can be made without departing from the spirit and scope thereof, and, therefore, only such limitations should be imposed as are indicated by the appended claims.

What is claimed is:

1. A method of coating a metal substrate comprising:
   (a) heating the metal substrate to a temperature of about 120° C. to about 250° C. to provide a preheated metal substrate;
   (b) heating a solid, thermoplastic coating composition to a temperature of about 180° C. to about 240° C. to melt the coating composition and provide a molten coating composition, said coating composition comprising:
      (i) about 50% to about 95%, by total weight of the composition, of a polyester having a weight average molecular weight of about 10,000 to about 35,000, a glass transition temperature of about −30° C. to about 120° C., a melt viscosity of about 75 to about 150 Pa.s at 240° C., a melt flow index of about 20 to about 200 g/10 min at 200° C., and a softening point of about 120° C. to about 200° C., and
      (ii) about 5% to about 15%, by total weight of the composition, of a modifying resin selected from the group consisting of an epoxy resin having an epoxy equivalent weight of about 500 to about 3,000;
   (c) extruding the molten coating composition onto a surface of the preheated metal substrate to provide a layer of molten coating composition about one to about 40 microns thick on the preheated metal substrate and provide a coated metal substrate; and
   (d) allowing the coated metal substrate to cool.

2. The method of claim 1 further comprising the step of heating the cooled coated metal substrate of step (d) at a temperature of about 250° C. to about 550° C. for about 5 to about 30 seconds.

3. The method of claim 2 wherein the heating step is performed at 300° C. to about 500° C. for about 15 to about 20 seconds.

4. The method of claim 1 wherein the thermoplastic coating composition further comprises:
   (iii) 0% to about 50%, by total weight of the composition, of an inorganic filler; and
   (iv) 0% to about 4%, by total weight of the composition, of a flow control agent.

5. The method of claim 4 wherein the coating composition comprises 0% to about 20% by total weight of the composition of an inorganic filler.

6. The method of claim 4 wherein the inorganic filler is selected from the group consisting of clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof.

7. The method of claim 4 wherein the flow control agent comprises an acrylic resin.

8. The method of claim 1 wherein the thermoplastic coating composition further comprises 0% to about 50%, by total weight of the composition, of a second modifying polymer.

9. The method of claim 8 wherein the second modifying polymer is a thermoplastic polymer.

10. The method of claim 8 wherein the second modifying polymer is a thermoset polymer.

11. The method of claim 8 wherein the second modifying polymer is selected from the group consisting of a carboxylated polyester, a carboxylated polyolefin, a polyamide, a fluorocarbon resin, a polycarbonate, a styrene resin, an acrylonitrile-butadiene-styrene resin, a chlorinated polyether, a urethane resin, and mixtures thereof.

12. The method of claim 8 wherein the second modifying polymer is capable of providing a coated metal substrate having a nongloss appearance.

13. The method of claim 1 wherein the metal substrate is selected from the group consisting of aluminum, tin-free steel, tinplate, steel, zinc-plated steel, zinc alloy-plated steel, lead-plated steel, lead alloy-plated steel, aluminum-plated steel, aluminum alloy-plated steel, and stainless steel.

14. The method of claim 2 wherein the coating composition is heated to a maximum of 100° C. above a melting point of the coating composition.

15. The method of claim 1 wherein the coating composition is free of organic solvents.

16. The method of claim 1 wherein the coating composition comprises about 60% to about 85%, by total weight of the composition, of a polyester.

17. The method of claim 1 wherein the polyester has a weight average molecular weight of about 15,000 to about 25,000.

18. The method of claim 1 wherein the polyester has an acid number of 0 to about 150 mg KOH/g and a hydroxyl number of 0 to about 150 mg KOH/g.

19. The method of claim 1 wherein the polyester has a glass transition temperature of about 15° C. to about 100° C.

20. The method of claim 1 wherein the polyester has a melt viscosity of about 90 to about 125 Pa.s at 240° C.

21. The method of claim 1 wherein the polyester comprises condensation product of (i) a dicarboxylic acid or an esterifiable derivative of a dicarboxylic acid, and (ii) an aliphatic diol, wherein at least 60 mol % of the dicarboxylic acid or dicarboxylic acid derivative is an aromatic dicarboxylic acid.

22. The method of claim 21 wherein the aromatic dicarboxylic acid is selected from the group consisting of phthalic acid, isophthalic acid, terephthalic acid, a naphthalene dicarboxylic acid, and mixtures thereof.

23. The method of claim 1 wherein the polyester comprises the reaction product of (i) a dicarboxylic acid or an esterifiable derivative of a dicarboxylic acid, and (ii) a low molecular weight epoxy resin having an EEW of about 150 to about 500.

24. The method of claim 1 wherein the epoxy resin is a solid material containing an average of about 1.5 to about 2.5 epoxy groups per molecule of the epoxy resin.

25. The method of claim 1 wherein the epoxy resin is a solid material containing an average of about 2.5 to about 6 epoxy groups per molecule of the epoxy resin.

26. The method of claim 1 wherein the epoxy resin comprises a mixture of an epoxy resin having about 1.5 to about 2.5 epoxy groups per molecule of the epoxy resin and an epoxy resin having about 2.5 to about 6 epoxy groups per molecule of the epoxy resin.

27. The method of claim 1 wherein the epoxy resin is an aromatic epoxy resin.

28. The method of claim 27 wherein the aromatic epoxy resin is based on bisphenol A or bisphenol F.

29. The method of claim 1 wherein the molten coating composition is extruded onto opposing surfaces of the preheated metal substrate.

30. The method of claim 1 wherein the layer of molten coating composition is about 2 to about 30 microns thick.

31. The method of claim 1 wherein the layer of molten coating composition is about 1 to about 10 microns thick.

32. The method of claim 1 wherein the molten coating composition is extruded onto the preheated metal substrate by an extruder comprising a screw and die, wherein the preheated metal substrate is moving relative to the die.

33. The method of claim 32 wherein the screw is a single screw, a conrotatory twin screw, or a counter rotatory twin screw.

34. The method of claim 1 wherein the thermoplastic coating composition further comprises a pigment, an organic dye, or a mixture thereof.

35. A method of coating an aluminum substrate comprising:
 (a) heating the aluminum substrate to a temperature of about 120° C. to about 250° C. to provide a preheated aluminum substrate;
 (b) heating a solid, thermoplastic coating composition to a temperature of about 180° C. to about 240° C. to melt the coating composition and provide a molten coating composition, said coating composition comprising:
  (i) about 50% to about 95%, by total weight of the composition, of a polyester having a weight average molecular weight of about 10,000 to about 35,000, a glass transition temperature of about −30° C. to about 120° C., a melt viscosity of about 75 to about 150 Pa.s at 240° C., a melt flow index of about 20 to about 200 g/10 min at 200° C., and a softening point of about 120° C. to about 200° C., and
  (ii) about 5% to about 15%, by total weight of the composition, of an epoxy modifying resin having an epoxy equivalent weight of about 500 to about 3,000;
 (c) extruding the molten coating composition onto a surface of the preheated aluminum substrate to provide a layer of molten coating composition about one to about 40 microns thick on the preheated aluminum substrate and provide a coated aluminum substrate; and
 (d) allowing the coated aluminum substrate to cool.

36. The method of claim 35 wherein the thermoplastic coating composition further comprises:
 (iii) about 5% to about 50%, by total weight of the composition, of a calcium sulfate filler; and
 (iv) about 0.5% to about 4%, by total weight of the composition, of a flow control agent.

37. The method of claim 36 wherein the thermoplastic coating composition further comprises 0% to about 50%, by total weight of the composition, of a carboxylated polyester as a second modifying polymer.

38. A method of coating a metal substrate comprising:
 (a) heating the metal substrate to a temperature of about 120° C. to about 250° C. to provide a preheated metal substrate;
 (b) heating a solid, thermoplastic coating composition to a temperature of about 180° C. to about 240° C. to melt the coating composition and provide a molten coating composition, said coating composition comprising:
  (i) about 50% to about 95%, by total weight of the composition, of a polyester having a weight average molecular weight of about 10,000 to about 35,000, a glass transition temperature of about −20° C. to about 25° C., a melt viscosity of about 70 to about 80 Pa.s at 240° C., a melt flow index of about 70 to about 80 g/10 min at 200° C., and a softening point of about 170° C. to about 180° C., and
  (ii) about 5% to about 15%, by total weight of the composition, of an epoxy modifying resin having an epoxy equivalent weight of about 500 to about 3,000;
 (c) extruding the molten coating composition onto a surface of the preheated metal substrate to provide a layer of molten coating composition about one to about 40 microns thick on the preheated metal substrate and provide a coated metal substrate; and
 (d) allowing the coated metal substrate to cool.

39. A method of coating a metal substrate comprising:
 (a) heating the metal substrate to a temperature of about 120° C. to about 250° C. to provide a preheated metal substrate;
 (b) heating a solid, thermoplastic coating composition to a temperature of about 180° C. to about 240° C. to melt the coating composition and provide a molten coating composition, said coating composition having a melt flow index of about 65 to about 95 g/10 minutes at 200° C. and a melting peak of about 155° C. to about 170° C., as determined by differential scanning calorimetry, and said coating composition comprising:
  (i) about 50% to about 95%, by total weight of the composition, of a blend of polyesters, each polyester having a weight average molecular weight of about 10,000 to about 35,000, a glass transition temperature of about 20° C. to about 25° C., a melt viscosity of about 35 to about 80 Pa.s at 240° C., a melt flow index of about 70 to about 120 g/10 min at 200° C., and a softening point of about 140° C. to about 180° C., and
  (ii) about 5% to about 15%, by total weight of the composition, of an epoxy modifying resin having an epoxy equivalent weight of about 500 to about 3,000;
 (c) extruding the molten coating composition onto a surface of the preheated metal substrate to provide a layer of molten coating composition about one to about 40 microns thick on the preheated metal substrate and provide a coated metal substrate; and
 (d) allowing the coated metal substrate to cool.

* * * * *